United States Patent Office 3,337,536
Patented Aug. 22, 1967

3,337,536
10-(BASIC SUBSTITUTED)-DIBENZ[b,f][1,4] OXAZEPINONES
Jean Schmutz, Muri, near Bern, and Fritz Hunziker, Bern, Switzerland, assignors to Dr. A. Wander S.A., Bern, Switzerland, a corporation of Switzerland
No Drawing. Filed Dec. 31, 1963, Ser. No. 334,931
Claims priority, application Switzerland, Jan. 3, 1963, 13/63
2 Claims. (Cl. 260—239.3)

This invention is generally concerned with basic substituted heterocyclic compounds, and more specifically with 10-(basic substituted)-dibenz[b,f][1,4]oxazepinones of the formula:

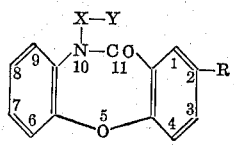

(I)

and acid addition salts thereof. In Formula I, X denotes propylenyl; Y is a lower dialkylated amino residue, e.g. dimethylamino or diethylamino; and R denotes halogen.

The compounds according to Formula I are obtained by cyclizing N - substituted o - amino - o' - carboxyl - diphenylethers of the formula:

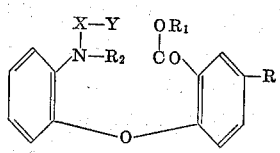

(II)

in which X, Y, and R have the above-mentioned meaning and in which $R_1$ denotes hydrogen or lower alkyl, and $R_2$ hydrogen or acyl, especially benzoyl or acetyl, under cleavage of water, a carboxylic acid, an alcohol, or an ester, respectively. Ring closure is effected, depending upon the nature of the substituents $R_1$ and $R_2$, by moderate or strong heating of the starting compound, in the absence or presence of a suitable solvent, such as xylol or dioxane.

In the said process the starting compound need not be used in isolated form. Rather, the process can even be carried out together with the introduction of the basic group —X—Y, which normally is the preliminary stage, in one single step, without isolating the II compound. To do this, a compound of the formula:

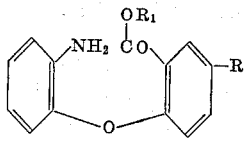

(III)

in which R and $R_1$ have the above-mentioned meaning, is heated in the presence of an ester of a basic alkanol of the formula HO—X—Y, wherein X and Y have the said meaning, until ring closure occurs, if necessary after prior, or under simultaneous action of a condensing agent. The ester may, for instance, be a hydrohalic acid, a sulfonic acid, or a carbonic acid ester. As condensing agents, alkali metals, their hydrides and amides or other alkali metal compounds are suitable, e.g. sodium amide, sodium hydride, phenyl sodium or tertiary butyl potassium.

The desired products are also obtained by introducing into dibenz[b,f][1,4]oxazepinones of the formula:

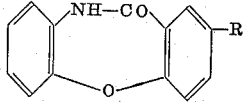

(IV)

in which R has the above-mentioned meaning, a basic residue of the formula —X—Y, wherein X and Y have the said meaning. Introduction of the basic residue is effected by reacting the compound of Formula IV with an ester of an alcohol of the formula HO—X—Y, if necessary after prior, or under simultaneous, action by a condensing agent of the type mentioned above. The ester may, for instance, be a hydrohalic acid, sulfonic acid, or carbonic acid ester. Pretreatment with a condensing agent is, in general, indicated when hydrohalic acid or sulfonic acid esters are used, while carbonic acid esters can be reacted without using a condensing agent.

The desired 10-(basic substituted)-dibenz[b,f][1,4]-oxazepinones (I) are also obtained by reacting esters of an alcohol of the formula:

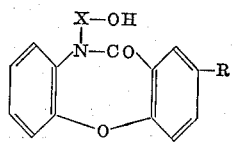

(V)

in which X and R have the meaning mentioned earlier, for instance, hydrohalic or sulfonic acid esters, with an amine of the formula H—Y, wherein Y has the above-mentioned meaning. The esters of the compound V are obtained, for example, by reacting a compound of Formula IV with a preferably mixed diester of glycol of the formula HO—X—OH, for instance, with a chlorobromoalkane, if necessary after prior, or under simultaneous, action by a condensing agent. It may also be prepared by treating a compound of Formula IV first with an alkylene oxide or alkylene chlorohydrine tetrahydropyranylether and then by esterifying with an appropriate acid, e.g. a hydrohalic acid.

A further possibility of producing the desired products lies in alkylating primary amines of formula:

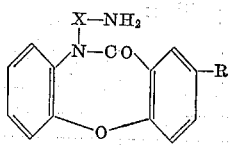

(VI)

in which X and R have the meaning mentioned earlier, for instance, by reacting them with an ester, especially a hydrohalic acid ester, of a lower alkanol, or by reacting the primary amines (VI) with aldehydes in the presence of a catalyst or of a reducing agent, such as formic acid (reductive alkylation). The starting materials according to Formula VI are in turn obtained, for example, by reacting esters of the alcohols of Formula V with ammonia or by reducing corresponding nitriles.

The 10-(basic substituted)-dibenz[b,f][1,4]oxazepinones according to Formula I produced by one of the processes described can be obtained and used not only as free bases but also in the form of their addition salts with suitable acids, such as hydrohalic acids, sulfuric, nitric phosphoric, acetic, oxalic, malonic, succinic, maleic, tartaric, or toluene sulfonic acid. The bases per se as well as the acid addition salts are used as active substances in medicines. They are particularly of interest as thymoleptic and antidepressant agents. In this respect, the 2-chloro-10-γ-dimethyl-aminopropyl-10,11-dihydro-11-oxo-dibenz [b,f][1,4]oxazepine and its acid addition salts show particularly favourable properties.

EXAMPLE 1

12.3 gm. (0.05 mol) of 2-chloro-10,11-dihydro-11-oxo-dibenz[b,f][1,4]oxazepine are boiled for 2 hours with 2.50 gm. (0.065 mol) of pulverized sodium amide in 80 ml. of absolute dioxane. To the reaction mixture is added a solution of 6.7 gm. (0.06 mol) of γ-dimethylaminopropyl-chloride in 12 ml. of toluene, and the whole is boiled for another 16 hours under reflux. Then the reaction mixture is evaporated to dryness in vacuo and the residue is mixed with water, made alkaline with concentrated soda lye and extracted with ether. The ethereal solution is washed with water and exhaustively extracted with diluted hydrochloric acid. The acid extract is washed with ether and made strongly alkaline with concentrated soda lye. By re-extraction with ether and working up of the ethereal solution there are obtained 14.2 gm. of 2-chloro-10-γ-dimethylaminopropyl-10,11-dihydro-11-oxo-dibenz-[b,f][1,4]oxazepine in the form of a yellowish, very viscous oil of the boiling point 163–170° C./0.07 mm. Hg. The hydrochloride thereof shows a melting point of 161–164° C. (from acetone/methanol/ether).

EXAMPLE 2

8.0 gm. (0.03 mol) of o-amino-diphenylether-p'-chloro-o'-carboxylic acid-methyl ester are boiled in 50 ml. of absolute dioxane with 1.29 gm. (0.033 mol) of powdered sodium amide for 1 hour under reflux. After adding 4.1 gm. (0.036 mol) of γ-dimethylaminopropyl-chloride the whole is boiled for another 16 hours. After evaporation in vacuo the residue is distributed between ether and water. The strongly basic fractions are isolated in the usual way by extraction with diluted acetic acid. By high-vacuum distillation there is obtained 2-chloro-10-γ-dimethylaminopropyl-10,11-dihydro-11-oxo-dibenz[b,f][1,4]-oxazepine, identical with the product of Example 1, in a yield of 75% of the theoretical.

*Production of tablets*

For the manufacture of tablets, the products of the present invention, preferably in the form of the hydrochlorides or of other acid addition salts, can be mixed with lactose and granulated with water, 0.5% sodium alginate or 1% gelatine solution. The dried granulate can be compressed into tablets in the presence of about 5% of talcum, 5% of corn starch and 0.1% of magnesium stearate. In this way, there are obtained, e.g. tablets of the following composition:

|  | Mg. |
|---|---|
| 2 - chloro-10-γ-dimethylaminopropyl-10,11-dihydro-11-oxo-dibenz[b,f][1,4]oxazepine | 20 |
| Lactose | 160 |
| Corn starch | 10 |
| Talcum | 10 |
| Magnesium stearate | 0.2 |

These 0.200 g. tablets possess antidepressant action and can be administered orally in appropriate indications.

*Production of solutions*

Injectable solutions are obtained, for example, by dissolving in bidistilled water the products of the present invention in the form of their hydrochlorides or other acid addition salts and by adding sodium chloride or glucose until isotonic concentration is reached. The solutions are filtered free of germs, filled into ampoules and sterilized for 30 minutes at 120° C. in the autoclave. In this way, there is obtained, for example, an injectable solution of the following composition:

|  | Mg. |
|---|---|
| 2 - chloro-10-γ-dimethylaminopropyl-10,11-dihydro-11-oxo-dibenz[b,f][1,4]oxazepine hydrochloride | 5 |
| Sodium chloride | 41.5 |
| Bidistilled water, up to 5 ml. | |

This solution, when administered intravenously, possesses antidepressant action and can be used in appropriate indications.

We claim:

1. A compound selected from the class consisting of 2 - halogen-10-γ-di(loweralkyl)aminopropyl)10,11-dihydro-11-oxo-dibenz[b,f][1,4]oxazepines of the formula:

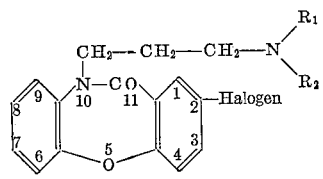

wherein $R_1$ and $R_2$ are members of the class consisting of methyl and ethyl; and pharmaceutically acceptable acid addition salts thereof.

2. 2 - chloro-10-γ-dimethylaminopropyl-10,11-dihydro-11-oxo-dibenz[b,f][1,4]oxazepine.

References Cited

UNITED STATES PATENTS 2,852,510  9/1958  Hoffmann et al. ____ 260—239.3

OTHER REFERENCES

Brewster et al.: "J. Am. Chem. Soc.," vol. 56, pp. 117–120 (1934).

Burger: "Medicinal Chemistry," 2nd ed., pp. 72–81 (Interscience) (1960).

Noller: "Chemistry of Organic Compounds," 2nd ed., page 272 (Saunders (1957)).

Tomita et al.: "J. Pharm. Soc. Japan," vol. 75, pp. 1134–40 (1955).

WALTER A. MODANCE, *Primary Examiner.*

R. T. BOND, *Assistant Examiner.*